United States Patent
Ventrella et al.

(10) Patent No.: US 12,001,060 B2
(45) Date of Patent: Jun. 4, 2024

(54) SAFETY FEMALE ADAPTER DEVICE FOR FIBER OPTIC CONNECTIONS

(71) Applicant: F.A.I.T FABBRICA APPARECCHIATURE PER IMPIANTI DI TELECOMUNICAZIONE—SOCIETA' A RESPONSABILITA' LIMITATA, Rome (IT)

(72) Inventors: Alfredo Ventrella, Rome (IT); Giovanni Pugliese, Rome (IT)

(73) Assignee: F.A.I.T FABBRICA APPARECCHIATURE PER IMPIANTI DI TELECOMUNICAZIONE—SOCIETA' A RESPONSABILITA' LIMITATA, Rome (IT)

( * ) Notice: Subject to any disclaimer, the term of this patent is extended or adjusted under 35 U.S.C. 154(b) by 157 days.

(21) Appl. No.: 17/625,697

(22) PCT Filed: Jul. 10, 2020

(86) PCT No.: PCT/IT2020/050172
§ 371 (c)(1),
(2) Date: Jan. 7, 2022

(87) PCT Pub. No.: WO2021/009784
PCT Pub. Date: Jan. 21, 2021

(65) Prior Publication Data
US 2022/0276446 A1    Sep. 1, 2022

(30) Foreign Application Priority Data
Jul. 12, 2019   (IT) .................. 102019000011631

(51) Int. Cl.
*G02B 6/38*   (2006.01)

(52) U.S. Cl.
CPC .......... *G02B 6/3825* (2013.01); *G02B 6/387* (2013.01)

(58) Field of Classification Search
None
See application file for complete search history.

(56) References Cited

U.S. PATENT DOCUMENTS 5,719,977 A * 2/1998 Lampert .............. G02B 6/3831
385/60
5,804,765 A    9/1998 Siemon et al.
(Continued)

FOREIGN PATENT DOCUMENTS

EP    1 341 015 A1    9/2003
EP    2 045 636 A1    4/2009
(Continued)

OTHER PUBLICATIONS

International Search Report and Written Opinion received in PCT Application No. PCT/IT2020/050088 dated Dec. 6, 2020 in 11 pages.
(Continued)

*Primary Examiner* — Chad H Smith
(74) *Attorney, Agent, or Firm* — Knobbe, Martens, Olson & Bear, LLP

(57) ABSTRACT

The present invention relates to a safety female adapter device for fiber optic connections, configured to house a male optical connector, characterized in that it includes controlled release locking means configured to constrain a longitudinal sliding of the male connector with respect to the female adapter device, when the connector is inserted in the adapter device to establish the optical connection, and release the longitudinal sliding of the connector with respect to the adapter device, during the insertion or disconnection of the male connector in/from the female adapter device.

7 Claims, 2 Drawing Sheets

(56) References Cited

U.S. PATENT DOCUMENTS

| | | |
|---|---|---|
| 5,838,858 A | 11/1998 | White |
| 2002/0081076 A1 | 6/2002 | Lampert et al. |
| 2003/0063868 A1 | 4/2003 | Fentress |
| 2005/0058402 A1 | 3/2005 | Ernst et al. |
| 2008/0118206 A1 | 5/2008 | Wagner et al. |
| 2008/0273837 A1 | 11/2008 | Margolin et al. |
| 2010/0310222 A1 | 12/2010 | Zhou et al. |
| 2011/0091154 A1 | 4/2011 | Chang |
| 2011/0194828 A1 | 8/2011 | Hackett |
| 2014/0023322 A1 | 1/2014 | Gnadek |
| 2016/0178855 A1 | 6/2016 | Tseng |
| 2018/0210154 A1 | 7/2018 | de Jong |
| 2018/0224608 A1 | 8/2018 | Liu et al. |
| 2018/0329155 A1 | 11/2018 | Verheyden |
| 2018/0348447 A1 | 12/2018 | Nhep et al. |

FOREIGN PATENT DOCUMENTS

| | | | |
|---|---|---|---|
| EP | 2 980 939 A1 | | 2/2016 |
| EP | 2 993 750 A2 | | 3/2016 |
| FR | 2 957 155 A1 | | 9/2011 |
| JP | 2001-013365 | | 1/2001 |
| WO | WO 02/075859 A1 | | 9/2002 |

OTHER PUBLICATIONS

International Preliminary Report on Patentability received in PCT Application No. PCT/IT2020/050088 dated Jun. 9, 2021 in 14 pages.
Italian Search Report received in Italian Application No. 201900005080 dated Nov. 21, 2019 in 10 pages.
Italian Search Report received in Italian Application No. 201900011643 dated Mar. 25, 2020 in 11 pages.
Italian Search Report received in Italian Application No. 201900015872 dated May 19, 2020 in 9 pages.
Official Communication received in Chinese Application No. 202080040899.3 dated Jul. 19, 2022 in 15 pages.
European Search Report received in European Application No. 20185339 dated Dec. 10, 2020 in 9 pages.
European Search Report received in European Application No. 20192816 dated Feb. 3, 2021 in 7 pages.
European Office Action received in European Application No. 20192816.5 dated Mar. 14, 2022 in 5 pages.
International Search Report and Written Opinion of the International Searching Authority for International Application No. PCT/IT2020/050172, dated Nov. 3, 2020 in 9 pages.
International Preliminary Report on Patentability for International Application No. PCT/IT2020/050172, dated Dec. 10, 2021 in 14 pages.
Search Report and Written Opinion for Italian Application No. 201900011631, dated Mar. 10, 2020 in 9 pages.

* cited by examiner

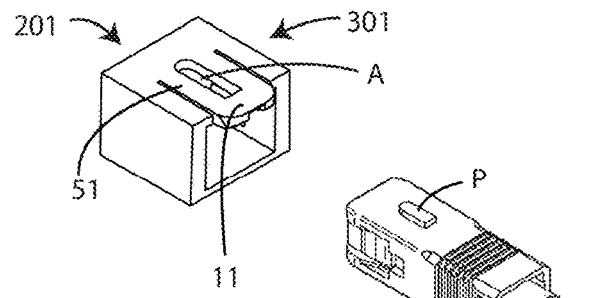
Fig. 1
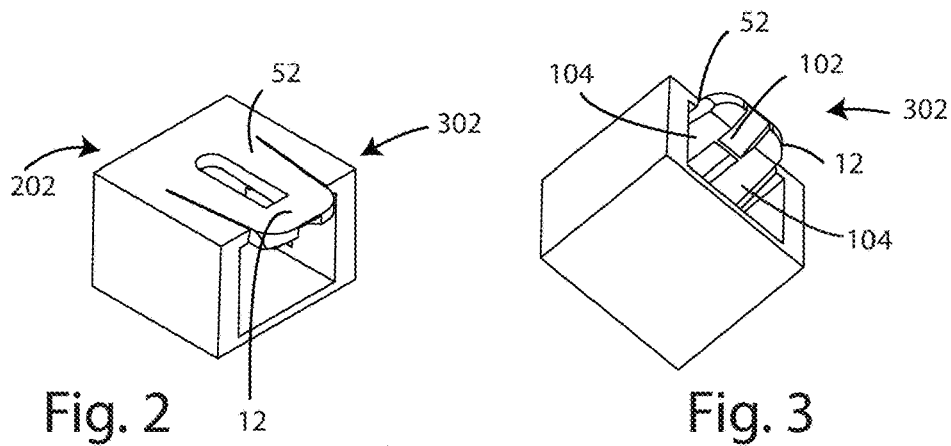
Fig. 2   Fig. 3
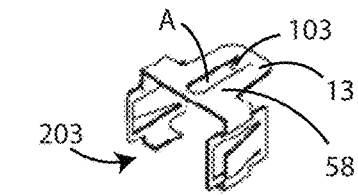
Fig. 4
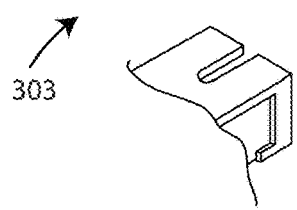
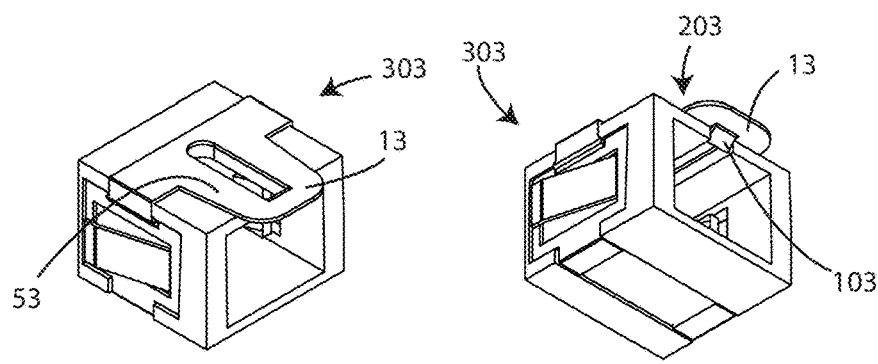
Fig. 5   Fig. 6

SAFETY FEMALE ADAPTER DEVICE FOR FIBER OPTIC CONNECTIONS

CROSS-REFERENCE TO RELATED APPLICATIONS

This application is the U.S. National Phase under 35. U.S.C. § 371 of International Application PCT/IT2020/05172, filed Jul. 10, 2020. The disclosures of the above described applications are hereby incorporated by reference in their entirety and made a part of this specification.

BACKGROUND

Field

The present invention relates to a safety adapter for fiber optic connections, in particular a standard SC female adapter configured to house a standard SC optical male connector.

Description of Related Art

Fiber optic data transfer systems are continuously increasing all over the world.

These systems provide for the transmission of data using coherent light signals transmitted through optical fiber cables which include a central optical fiber made of glass or plastic material, apt to transmit the light signal, an internal protective sheath made of nylon, kevlar fibers that serve to reinforce the cable, increasing its tensile strength and an external sheath in plastic or rubbery material.

The connections between the terminations of fiber optic cables must be made with great precision to allow the passage of the light signal from one optic fiber to another with the lower possible dispersion.

In normal use, the cables for optic fibers are provided at the terminal ends with standard male connectors, so that a user's optic fiber cable can be connected to an optical network via a female adapter positioned at the network downstream, or that two cables can be joined together by means of a standard female-female connection element.

These connectors make direct contact between the ends of two fibers by exerting a force which tends to keep these ends together.

Optic fibers can be of different types, generally single mode or multimode, depending on the signal bandwidth to be transmitted and the length of the optical link.

Fiber optic connectors can also be of different types, for example SC or LC or FC or ST or MU or others, depending on the application in which they are to be used.

In the field of telecommunications, glass fibers are generally used with a section useful for the passage of the optical signal having a diameter of about 9 μm and with transmitted signal powers such as to allow long optical fiber portions without the need to re-amplify the signal optical.

These characteristics of the fiber optic systems impose several particularities to be kept in mind.

An important feature is that the end faces of the optic fibers to be connected in the adapters (female or female-female) are free of impurities, such as dust, greases or slags that would degrade the quality of the transmitted signal.

The known technique provides for the use of closing plugs for the male connector to prevent the end face of the optic fiber coming out of the male connector from getting dirty.

There are also female adapters in which the opening of the housing for the male connector is protected by a removable plug or is equipped with a door, also automatically closable, which protects against the entrance of impurities when the male connector is not inserted.

The use of protections also creates safety against damage to the human eye, preventing the light beam from escaping.

Known connector systems are generally suitable for use in technical and professional areas, with personnel skilled in the field and in specific use.

With the diffusion of optic fiber systems in the consumer and non-professional market, the access and use of these systems has expanded to non-technical users who are not specifically trained for proper management and maintenance.

This leads to an increase in the possibility of malfunctions or damage to the devices and to the users themselves, due to incorrect use of the optical equipment.

In addition, the increase in the market involves the research for safer and more effective connection solutions.

An example of domestic installation, and of fiber diffusion in houses and offices, is based on FTTH (Fiber To The Home) technology, where SC connectors are generally used. In particular, in this case at least one female adapter is provided, for example at the output of a network socket in the reference environment of the end user, and an optic fiber cable wired for connection to the user device.

An inexperienced user, for example a child, with the solutions used in the prior art, can easily disconnect the optical male connector from the adapter provided on the user socket.

These acts would lead not only to an interruption of the reception of signals but above all to possible damage to the health of the person if the eyes of the person intercepted the optical signals coming from one of the two male optical connectors now disconnected.

Systems that prevent unwanted disconnections of components of optical connections, other than the systems currently in use at the state of the art, are therefore needed today more than ever.

SUMMARY

Therefore, the technical problem posed and solved by the present invention is that of providing an SC type female adapter device, configured to house an SC type male optical connector, which allows to overcome the drawbacks mentioned above with reference to the prior art.

This problem is solved by an adapter device according to claim 1.

Preferred features of the present invention are present in the claims depending on it.

The present invention provides some significant advantages.

In particular, the object according to the present invention allows to avoid the accidental disconnection of a male SC-type connector from the female adapter, the disconnection can not take place except through the use of an external tool and/or a specific maneuver of not immediate and intuitive execution by non-technical personnel, avoiding interruptions of connectivity and preventing the human eye from being hit by the light beam coming out of the open connection.

A further advantage is that the device according to the invention can also house a specially modeled closing plug, reducing the possibility of accidental disconnection of the plug unless using a special tool or release maneuver.

A still further advantage is that the invention described herein is applicable at any optical connection interface, for example at a wall-mounted socket box, a transmission/reception/transduction or distribution device of an optical signal, or at an adapter of the female-female type for the connection of two optic fiber terminals.

Other advantages, characteristics and methods of use of the present invention will become clear from the following detailed description of some embodiments, presented by way of example and without limitation.

BRIEF DESCRIPTION OF THE DRAWINGS

Reference will be made to the figures of the attached drawings, in which:

FIG. 1 shows a perspective view of an embodiment of the safety adapter device according to the present invention in an alignment configuration with a connector of a known type;

FIG. 2 shows a perspective view of a further embodiment of the device according to the present invention;

FIG. 3 shows a perspective view from below of the device of FIG. 2;

FIG. 4 shows a perspective view from the rear of an exploded view of a still further embodiment of the device according to the present invention;

FIG. 5 shows a front perspective view of the device of FIG. 4 in an assembled configuration;

FIG. 6 shows a perspective view from below of the device of FIG. 5;

DETAILED DESCRIPTION

Figure 7:
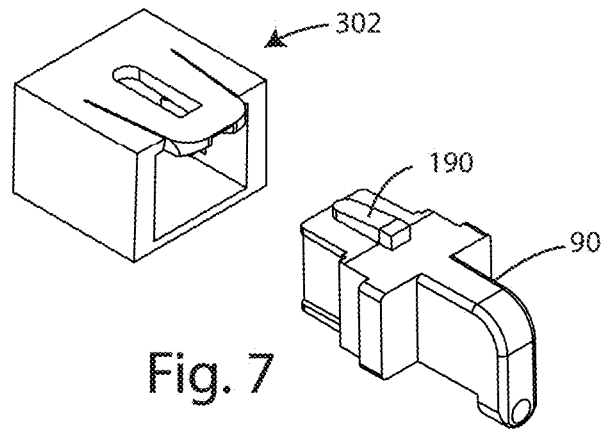
FIG. 7 shows an exploded perspective view of an embodiment of an adapter system according to the present invention.

With reference to FIGS. 1, 2 and 5, a safety female adapter device for standard SC connection for optic fiber cables according to a first, a second and a third embodiment of the invention, is respectively denoted as 301 overall, 302 and 303.

The female safety adapter 301, 302, 303 according to the present invention, configured to house a standard SC male optical connector, comprises a substantially box-shaped casing which defines a housing space for the connector.

As shown in the figures, the box-shaped casing is in particular shaped like a parallelepiped with two openings, on surfaces opposite to each other, one of which is front for inserting the male connector and the other rear for coupling a second female adapter device, even standard, or an optical component, active or passive.

At an insertion portion of the male connector, the casing has a longitudinal reference slot, sized to allow the reference protuberance P of the standard SC-type male connector to slide inside the slot and guide a coaxial insertion of the male connector into the female adapter device.

Advantageously, the female adapter according to the present invention comprises locking means 201, 202, 203 configured to constrain, or prevent, the longitudinal sliding of the connector with respect to the device when the connector is inserted into the adapter device to establish the optical connection, and to release, i.e. allowing longitudinal sliding of the connector with respect to the adapter device, during insertion or disconnection of the male connector in/from the female adapter device.

The locking means 201, 202, 203 are controlled release, that is, they can be unlocked at a given external stress. For example, as will be better described below, depending on the specific conformation of the locking means, these can be unlocked through a specific user maneuver, for example through the use of a specific tool or tool.

Preferably, the locking means of the examples described herein comprise a lever locking element 51, 52, 53, having a closing stop 11, 12, 13 at a terminal end of the slot A.

In particular, in the first two preferred embodiments, as shown in FIGS. 1 and 2, the lever locking element is obtained by means of two substantially longitudinal grooves made on a wall of the casing comprising the slot A. The lever locking element 51, 52 therefore has a base portion connected with the wall of the casing, and an end portion, preferably protruding from the casing, shaped to accommodate the insertion of the protuberance P, located on the standard SC male connector, inside slot A.

As shown in FIG. 3, the closing stop 12, in fact, has a guide portion 102 which is tilted in such a way as to facilitate insertion of the connector into the housing by lifting the lever element 52. Once the connector protuberance P has been inserted into the slot A, the closing stop 12 is lowered again, blocking an exit of the connector from the female adapter.

The lever locking element 52 also includes two rails 104 to delimit the guide 102 and direct the insertion of the protuberance P.

The lever locking element 51 of the first embodiment of the present invention, shown in FIG. 1, is substantially similar to the element 52 described above and shown in FIGS. 2 and 3.

The difference between the two embodiments is that, the lever locking element 51 is made between two notches parallel to an axis of longitudinal development of the device and insertion of the connector, while the notches that define the lever locking element 52 are converging towards one terminal end of the element 52.

Advantageously, therefore, the element 52 has a larger connection base, with the casing, and therefore, in particular in said connection area, it has a greater resistance to bending stresses due to the insertion and removal of the connector.

As shown in FIGS. 4, 5 and 6, in a third embodiment of the device 303 according to the present invention, the locking means comprises a removable plate 203 configured to be coupled to the box-shaped casing. In particular, as shown in FIG. 4, the box-shaped casing is in this case compliant and dimensionally similar to a standard SC female adapter.

Advantageously, the lever locking element 13 is made on the removable plate 203.

In particular, the plate 203 has a C-shape with two lateral gripping walls which allow it to be mounted on a known female adapter, for example a standard SC adapter.

Advantageously, as shown in FIGS. 4 and 6, the closing stop 13 of the element 53 has an interference fin 103. Once the protrusion P of the connector is inserted in the slot A, the closing stop 13 is lowered again blocking a detachment of the connector from the female adapter via the interference fin 103.

Advantageously, the specific conformation of the removable plate 203 allows its use in association with any standard SC female adapter.

Preferably, to allow protection of the housing from the entrance of impurities, when the male connector is not inserted, the present invention also relates to an adapter system 601, 602, 603 comprising a female adapter device, as described above, and a closing plug 90, configured to be housed in the box-shaped casing as an alternative to the optical connector.

Figure 8:
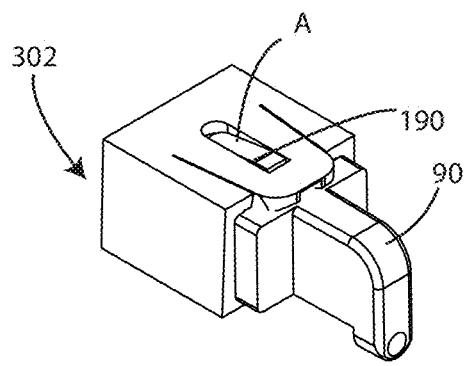
FIG. 8 shows a perspective view of the system of FIG. 7 in a coupling configuration.
Figure 9:
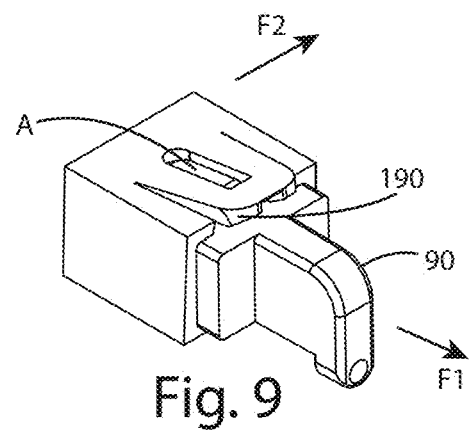
FIG. 9 shows a perspective view of the system of FIG. 8 in the decoupling phase.

FIGS. 7, 8 and 9 show the embodiment of the system 602 comprising the device 302. In the same way adapter systems 601 and 603 are provided, not shown in the figures, respectively comprising the device 301 and 303, and a plug 90.

In particular, as shown in FIG. 7, the closing plug 90 includes a reference protuberance 190 sized to be sliding into the slot A of the adapter.

Preferably, the protuberance 190 is dimensionally analogous and conforming to the protuberance P, for example provided on the standard SC connector, in such a way as to constrain a sliding of the plug 90 with respect to the female adapter device through an interaction of the protuberance 190 with the locking means 201, 202, 203 described above, as shown for example in FIG. 8.

When the adapter device must be used to allow an optical connection, the plug 90 is removed for example by means of stresses in the directions F1 and F2, as shown in FIG. 9, to ensure the removal of the block and allow the plug 90 to come out of the housing adapter.

Advantageously, the plug 90 also acts as a protection against an inexperienced user, preventing the light beam from coming out of the female adapter.

The present invention also relates to a female-female adapter 801, 802, 803 configured to house an optical connection between a first and a second standard SC male connector for optical fiber inserted or insertable in said adapter, wherein at least one of the two connector housings comprises a safety adapter device 301, 302, 303 as described above.

Figure 10:
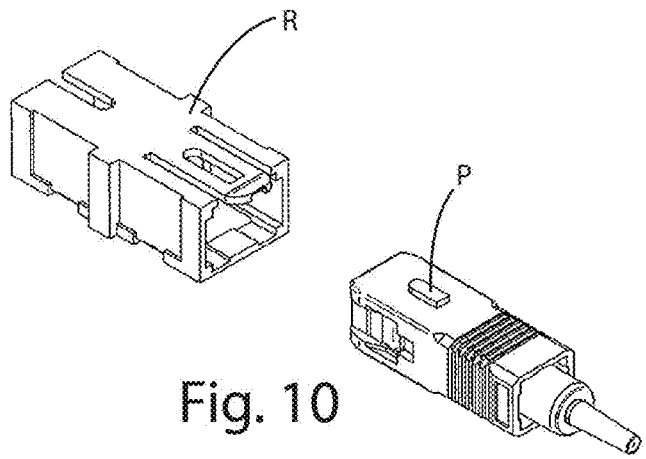
FIG. 10 shows an embodiment of a female-female connector comprising a device according to the present invention in an alignment configuration with a known type connector.

FIG. 10 shows the embodiment of the female-female adapter 801 comprising the device 301. In the same way female-female adapters 802 and 803 are provided, not shown in the figure, respectively comprising at least one device 302 and 303.

Furthermore, advantageously, the female adapter device 301, 302, 303 according to the present invention can be applied at any optical component D, active or passive, of transmission/reception/transduction or distribution.

Figure 11:
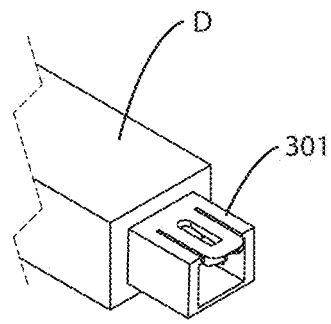
FIG. 11 shows an example of use of the device according to the present invention.

FIG. 11 shows the application of the device 301 according to the first embodiment.

In the same way, couplings of the devices 302 and 303 and any optical component D, active or passive, of transmission/reception/transduction or distribution, not shown in the figures, are provided.

The present invention has been described with reference to preferred embodiments. It is to be understood that other embodiments may exist that pertain to the same inventive core, as defined by the scope of protection of the claims set out below.

What is claimed is:

1. A safety female adapter device for fiber optic connections, configured to house a SC male optical connector,
   said safety female adapter device comprising a substantially box-shaped casing having a longitudinal reference slot on a wall of said casing at an insertion portion of the male connector, said slot being dimensioned to allow a reference protuberance of the SC male connector sliding inside the slot and guiding a coaxial insertion of the SC male connector into the female adapter device,
   said safety female adapter device comprising a controlled-release lock configured to constrain a longitudinal sliding of the male connector with respect to the safety female adapter device, when the connector is inserted into the safety female adapter device to establish the optical connection, and release the longitudinal sliding of the connector with respect to the safety female adapter device, during the insertion or removal of the male connector into/from the safety female adapter device, wherein said lock comprises a locking lever, wherein said locking lever is comprised between two substantially longitudinal notches running along said slot, said locking lever having a closing stop at a terminal end of said slot, said terminal end facing towards a front opening of said casing, said closing stop being able to be moved from a lowered position to a raised position to allow the insertion of the reference protuberance of the male connector into said slot and from a raised position to a lowered position to provide a blockage of an exit of the male connector from said safety female adapter device.

2. The safety female adapter device according to claim 1, wherein said closing stop has a tilted guide portion.

3. The safety female adapter device according to claim 2, wherein said locking lever has two lateral rails.

4. A double female adapter device configured to house an optical connection between a first and a second optic fiber connector inserted or insertable into said double female adapter device, comprising at least one safety female adapter device according to claim 1.

5. A safety adapter system comprising a safety female adapter device according to claim 1 and a closing plug configured to be housed into said safety female adapter device as an alternative to the optical connector.

6. The safety adapter system according to claim 5, wherein said closing plug comprises a reference protuberance dimensioned to be slidable into a slot of said safety female adapter device, said sliding being constrainable via an interaction of the protuberance with said lock.

7. An optical connection system comprising an active or passive optical device and a safety female adapter device according to claim 1.

* * * * *